US012363590B2

(12) United States Patent
Zaifman et al.

(10) Patent No.: US 12,363,590 B2
(45) Date of Patent: Jul. 15, 2025

(54) SYSTEMS AND METHODS FOR DETERMINING, MONITORING, AND PREDICTING APPLICATION CAPACITY IN MULTIPLE RADIO ACCESS NETWORKS

(71) Applicant: Verizon Patent and Licensing Inc., Basking Ridge, NJ (US)

(72) Inventors: Art Zaifman, Millburn, NJ (US); Massimiliano Troiani, Frisco, TX (US); Miguel A. Carames, Long Valley, NJ (US); Jayashree Srinivasan Kilkovalavedu, Monmouth Junction, NJ (US); Parry Cornell Booker, Sunnyvale, TX (US); Amanda C. Lam, Aliso Viejo, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 401 days.

(21) Appl. No.: 18/046,192

(22) Filed: Oct. 13, 2022

(65) Prior Publication Data

US 2024/0129801 A1    Apr. 18, 2024

(51) Int. Cl.
*H04W 28/08* (2023.01)
*H04W 28/02* (2009.01)
*H04W 28/18* (2009.01)

(52) U.S. Cl.
CPC ... *H04W 28/0967* (2020.05); *H04W 28/0205* (2013.01); *H04W 28/0268* (2013.01); *H04W 28/18* (2013.01)

(58) Field of Classification Search
CPC ......... H04W 28/0967; H04W 28/0205; H04W 28/0268; H04W 28/18; H04W 24/10; H04W 24/02; H04W 84/042; H04L 41/40; H04L 41/16
See application file for complete search history.

(56) References Cited

U.S. PATENT DOCUMENTS

| 2015/0382210 | A1* | 12/2015 | Kateley ................. H04W 24/08 455/424 |
| 2022/0086719 | A1* | 3/2022 | Devlic ................. H04L 41/5051 |
| 2023/0128527 | A1* | 4/2023 | Teshome ............... H04L 67/306 709/224 |

(Continued)

*Primary Examiner* — Charles C Jiang
*Assistant Examiner* — Margaret Marie Anderson

(57) ABSTRACT

A device may receive user device application performance logs, radio access network (RAN) performance logs, and multi-access edge computing (MEC) compute logs, and may train a machine learning model with the user device application performance logs, the RAN performance logs, and the MEC compute logs. The device may identify application capacity requirements and MEC compute requirements associated with images of RAN coverage areas of RANs, and may generate labeled and normalized images of RAN coverage areas. The device may receive real time MEC compute data, RAN performance data, and user device application data, and may identify one of the labeled and normalized images of the RAN coverage areas that matches a RAN coverage area of a particular RAN. The device may predict an application capacity and MEC compute requirements for the particular RAN, and may perform one or more actions based on the application capacity and the MEC compute requirements.

20 Claims, 10 Drawing Sheets

(56) References Cited

U.S. PATENT DOCUMENTS

| | | | | |
|---|---|---|---|---|
| 2023/0129344 A1* | 4/2023 | Mueller | ............... | H04B 7/0691 |
| | | | | 455/450 |
| 2023/0379731 A1* | 11/2023 | Ghadge | ................ | H04W 24/02 |
| 2025/0004848 A1* | 1/2025 | Géhberger | .............. | G06F 9/505 |

* cited by examiner

SYSTEMS AND METHODS FOR DETERMINING, MONITORING, AND PREDICTING APPLICATION CAPACITY IN MULTIPLE RADIO ACCESS NETWORKS

BACKGROUND

A multi-access edge computing (MEC) device may enable cloud computing capabilities and an information technology service environment at an edge of a network, such as a radio access network (RAN). The MEC device may execute applications and may perform related processing tasks closer to a customer (e.g., a user device) of the RAN, which may reduce network congestion, may improve end-to-end latency, and may increase performance of the applications.

DETAILED DESCRIPTION OF EXAMPLE EMBODIMENTS

Figure 1A:
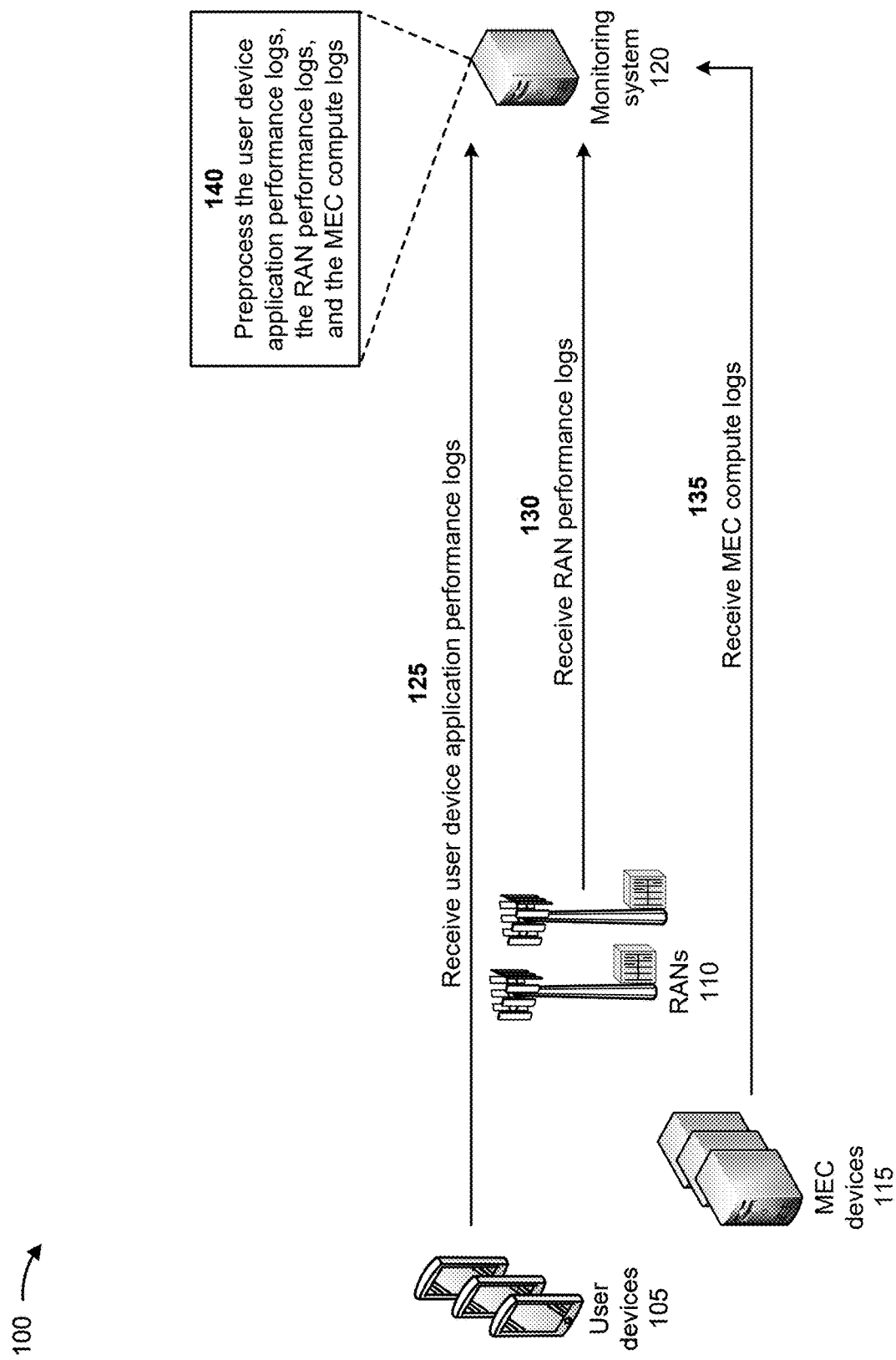
FIGS. 1A-1F are diagrams of an example associated with determining, monitoring, and predicting application capacity in multiple RANs.

The following detailed description of example implementations refers to the accompanying drawings. The same reference numbers in different drawings may identify the same or similar elements.

An MEC device may provide multiple applications to user devices associated with a RAN. Providing the applications to the user devices requires utilization of computing resources of the MEC device and the RAN. As a quantity of the applications increases, the computing resources of the MEC device and the RAN may become overloaded, throughput and bandwidth of the RAN may be reduced, and/or the like, which may affect the performances of the MEC device and the RAN. However, current mechanisms for handling applications provided by a MEC device, via a RAN, fail to optimize the computing resources of the MEC device and/or the RAN for an increased quantity of applications. Furthermore, optimizing the computing resources of the MEC device and/or the RAN requires expensive and time-consuming analysis of historical and real-time utilization of the MEC device and/or the RAN. Thus, current mechanisms for handling applications provided by a MEC device, via a RAN, consume computing resources (e.g., processing resources, memory resources, communication resources, and/or the like), networking resources, and/or other resources associated with reactively monitoring capacities of applications and computing resource usage of MEC devices and RANs, rebalancing traffic at RANs after observing network issues caused by application usage, causing a network disruption and lost traffic due to application usage, attempting to recover the lost traffic caused by the network disruption, and/or the like.

Some implementations described herein provide a monitoring system that determines, monitors, and predicts application capacity in multiple RANs. For example, the monitoring system may receive user device application performance information (e.g., logs, traces, events, and/or the like) from a plurality of user devices utilizing applications provided by a plurality of MEC devices, and may receive RAN performance information from a plurality of RANs associated with the plurality of user devices. The monitoring system may receive MEC compute information from the plurality of MEC devices, and may preprocess the user device application performance information, the RAN performance information, and the MEC compute information. The monitoring system may train a machine learning model, with the user device application performance information, the RAN performance information, and the MEC compute information, to generate a trained machine learning model, and may identify, based on training the machine learning model, application capacity requirements and MEC compute requirements associated with images of RAN coverage areas of the plurality of RANs. The monitoring system may generate labeled and normalized images of RAN coverage areas based on the application capacity requirements and MEC compute requirements, and may receive, in real time, MEC compute data associated with a particular MEC device, RAN performance data associated with a particular RAN, and user device application data associated with particular user devices. The monitoring system may identify, based on the MEC compute data, the RAN performance data, and the user device application data, one of the labeled and normalized images of the RAN coverage areas that matches a RAN coverage area of the particular RAN, and may predict an application capacity and MEC compute requirements for the particular RAN based on the one of the labeled and normalized images of the RAN coverage areas. The monitoring system may perform one or more actions based on the application capacity and the MEC compute requirements.

In this way, the monitoring system determines, monitors, and predicts application capacity in multiple RANs. For example, the monitoring system may determine and monitor usage of applications provided by an MEC device via a RAN, and may calculate capacities of the applications based on the determined usage of the applications. The monitoring system may determine additional applications that the MEC device may provide based on the usage of the existing applications, may increase usage of the existing applications based on the capacities of the applications, and/or the like. Increasing a quantity of additional applications provided by the MEC device and a quantity of existing applications provided by the MEC device may optimize the computing resources of the MEC device and/or the RAN. Thus, the monitoring system may conserve computing resources, networking resources, and/or other resources that would otherwise have been consumed by reactively monitoring capacities of applications and computing resource usage of MEC devices and RANs, rebalancing traffic at RANs after observing network issues caused by application usage, causing a network disruption and lost traffic due to application usage, attempting to recover the lost traffic caused by the network disruption, and/or the like.

FIGS. 1A-1F are diagrams of an example 100 associated with determining, monitoring, and predicting application capacity in multiple RANs. As shown in FIG. 1A, the example 100 may include user devices 105, RANs 110, and MEC devices 115 associated with a monitoring system 120.

Further details of the user devices 105, the RANs 110, the MEC devices 115, and the monitoring system 120 are provided elsewhere herein.

As shown in FIG. 1A, and by reference number 125, the monitoring system 120 may receive user device application performance logs. For example, the MEC devices 115 may provide multiple applications to the user devices 105 associated with the RANs 110. Providing the applications to the user devices 105 requires utilization of computing resources of the MEC devices 115 and the RAN 110. While the user devices 105 are utilizing the applications, the user devices 105 may generate the user device application performance logs that include data identifying performance of the applications utilized by the user devices 105, quality of service (QoS) associated with the applications when utilized by the user devices 105, bandwidth utilizations by the applications, throughput associated with the applications, and/or the like. The user devices 105 may provide the user device application performance logs to the monitoring system 120, and the monitoring system 120 may receive the user device application performance logs from the user devices 105. The monitoring system 120 may continuously receive the user device application performance logs from the user devices 105, may periodically receive the user device application performance logs from the user devices 105, may receive the user device application performance logs from the user devices 105 based on providing requests to the user devices 105, and/or the like.

As further shown in FIG. 1A, and by reference number 130, the monitoring system 120 may receive RAN performance logs. For example, while the user devices 105 are utilizing the applications, the RANs 110 may generate the RAN performance logs. The RAN performance logs may include data identifying radio frequency (RF) footprints of the RANs 110 during utilization of the applications by the user devices 105, signal strength/quality bands of the RF footprints during utilization of the applications by the user devices 105, and/or the like. The RANs 110 may provide the RAN performance logs to the monitoring system 120, and the monitoring system 120 may receive the RAN performance logs from the RANs 110. The monitoring system 120 may continuously receive the RAN performance logs from the RANs 110, may periodically receive the RAN performance logs from the RANs 110, may receive the RAN performance logs from the RANs 110 based on providing requests to the RANs 110, and/or the like.

As further shown in FIG. 1A, and by reference number 135, the monitoring system 120 may receive MEC compute logs. For example, while the user devices 105 are utilizing the applications, the MEC devices 115 may generate the MEC compute logs. The MEC compute logs may include data identifying computing resource utilization by the MEC devices 115 during utilization of the applications by the user devices 105. The MEC devices 115 may provide the MEC compute logs to the monitoring system 120, and the monitoring system 120 may receive the MEC compute logs from the MEC devices 115. The monitoring system 120 may continuously receive the MEC compute logs from the MEC devices 115, may periodically receive the MEC compute logs from the MEC devices 115, may receive the MEC compute logs from the MEC devices 115 based on providing requests to the MEC devices 115, and/or the like.

As further shown in FIG. 1A, and by reference number 140, the monitoring system 120 may preprocess the user device application performance logs, the RAN performance logs, and the MEC compute logs. For example, when preprocessing the user device application performance logs, the RAN performance logs, and the MEC compute logs, the monitoring system 120 may apply a grid overlay to data associated with the user device application performance logs, the RAN performance logs, and the MEC compute logs. The monitoring system 120 may include additional data in each grid square associated with the grid overlay. The additional data may include data identifying an identifier of one of the RANs 110 serving each grid square, a physical cell identifier (PCI) associated with each grid square, a timestamp associated with one of the user devices 105 entering into each grid square, a duration associated with one of the user devices 105 residing in each grid square, an identifier (e.g., international mobile equipment identity (IMEI), an international mobile subscriber identity (IMSI), an Internet protocol (IP) address, and/or the like) associated with one of the user devices 105 residing in each grid square, an identifier of application utilized by one of the user devices 105 residing in each grid square, and/or the like.

In some implementations, the grid overlay may enable the monitoring system 120 to apply many different classes of models to the problems addressed by the monitoring system 120. For example, the grid overlay enables determination of a percentage of RAN coverage falling into each RF signal strength band. Using such information, the monitoring system 120 may determine computing resource requirements to serve application users located in a geographical area defined by using various models or probability distributions that best match the arrival rates and durations of actual user devices. Provision of the additional data may enable the monitoring system 120 to apply deep learning models to problems that are geospatial in nature, such as determining a maximum quantity of user devices 105 that can be supported for the applications before application performance starts to decrease.

Figure 1B:
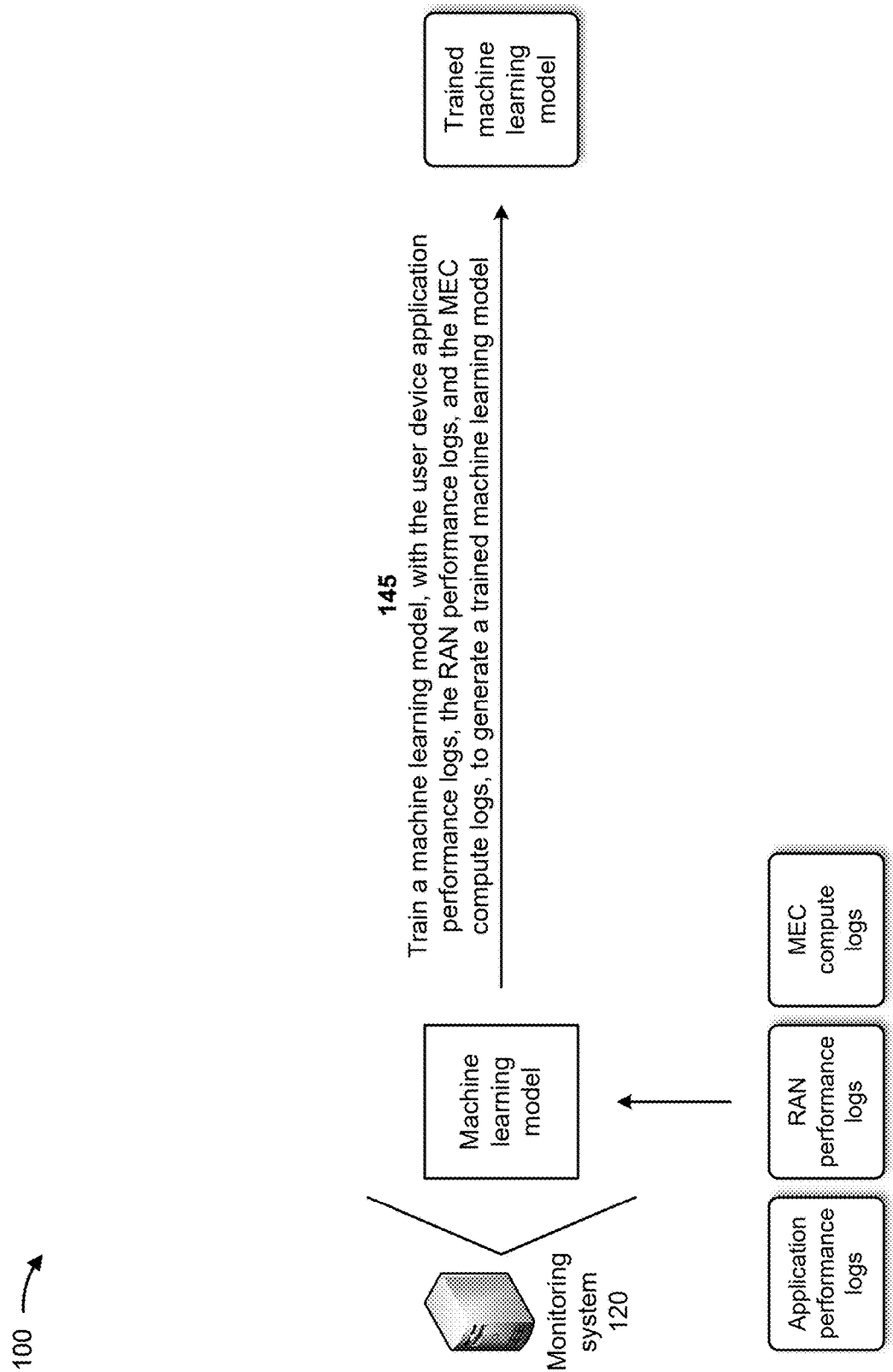

As shown in FIG. 1B, and by reference number 145, the monitoring system 120 may train a machine learning model, with the user device application performance logs, the RAN performance logs, and the MEC compute logs, to generate a trained machine learning model. For example, the monitoring system 120 may divide the user device application performance logs, the RAN performance logs, and the MEC compute logs into a first portion of the user device application performance logs, the RAN performance logs, and the MEC compute logs, a second portion of the user device application performance logs, the RAN performance logs, and the MEC compute logs, and a third portion of the user device application performance logs, the RAN performance logs, and the MEC compute logs. The first portion of data, the second portion of data, and the third portion of data may include a same quantity of the user device application performance logs, the RAN performance logs, and the MEC compute logs, different quantities of the user device application performance logs, the RAN performance logs, and the MEC compute logs, and/or the like. In some implementations, more of the user device application performance logs, the RAN performance logs, and the MEC compute logs may be allotted to the first portion of data since the first portion of data may be utilized to generate the training data set for the machine learning model.

The monitoring system 120 may generate a training dataset for the machine learning model based on the first portion of data. The monitoring system 120 may generate a validation dataset for the machine learning model based on the second portion of data. The monitoring system 120 may generate a test dataset for the machine learning model based on the third portion of data. In other implementations, the monitoring system 120 may utilize different portions of the user device application performance logs, the RAN performance logs, and the MEC compute logs to generate the training dataset, the validation dataset, and/or the test dataset for the machine learning model.

The monitoring system 120 may train the machine learning model with the training dataset to generate the trained machine learning model. As described elsewhere herein, the machine learning model may be trained to process real time MEC compute data, RAN performance data, and user device application data to identify a labeled and normalized image of a RAN coverage area that matches a RAN coverage area associated with the real time MEC compute data, RAN performance data, and user device application data. In some implementations, rather than training the machine learning model, the monitoring system 120 may obtain the trained machine learning model from another system or device that trained the machine learning model. In this case, the monitoring system 120 may provide the other system or device with the training dataset, the validation dataset, and/or the test dataset for use in training the machine learning model, and may provide the other system or device with updated training, validation, and/or test datasets to retrain the machine learning model in order to update the machine learning model.

In some implementations, the machine learning model may include an image classification model. An image classification model may comprehend an entire image as a whole, and may classify the image by assigning the image to a specific label. The image classification model may analyze an image and may identify a class of the image (or a probability of the image being part of a class). A class is essentially a label, such as, for example, "car," "animal," "building," and/or the like. The image classification model may include a convolutional neural network (CNN) model, an artificial neural network model, a support vector machine model, a k-nearest neighbor model, a naïve Bayes classifier model, a random forest model, and/or the like.

In some implementations, the monitoring system 120 may train the machine learning model with the training dataset to generate the trained machine learning model, and may process the validation dataset, with the trained machine learning model, to validate that the trained machine learning model is operating correctly. If the trained machine learning model is operating correctly, the monitoring system 120 may process the trained machine learning model, with the test dataset, to further ensure that the trained machine learning model is operating correctly. A trained machine learning model can be said to be operating correctly if it has adequate accuracy, has adequate precision, has adequate recall, is not subject to excessive overfitting, and/or the like. If the trained machine learning model is operating excessively incorrect, the monitoring system 120 may modify the trained machine learning model and may revalidate and/or retest the modified machine learning model based on the validation dataset and/or the test dataset.

Figure 1C:
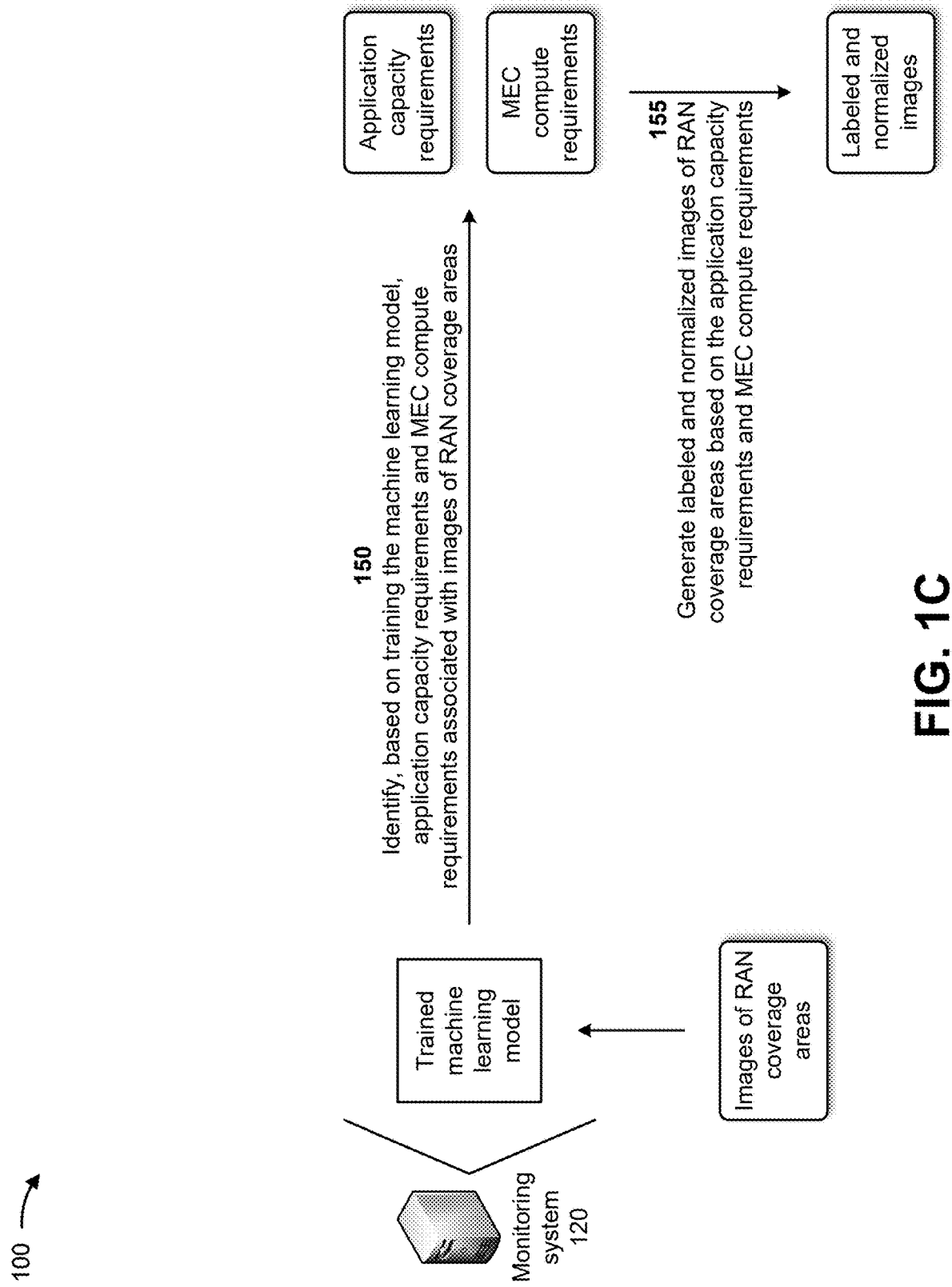

As shown in FIG. 1C, and by reference number 150, the monitoring system 120 may identify, based on training the machine learning model, application capacity requirements and MEC compute requirements associated with images of RAN coverage areas. For example, while training the machine learning model with the user device application performance logs, the RAN performance logs, and the MEC compute logs, the machine learning model may generate outputs, such as application capacity requirements and MEC compute requirements associated with images of RAN coverage areas associated with the user device application performance logs, the RAN performance logs, and the MEC compute logs. In some implementations, when an image of a RAN coverage area (e.g., a grid square of the grid overlay described above) includes information about applications currently executing within the grid square (e.g., information identifying types of the applications, traffic volumes of the applications, a maximum tolerated latency for the applications, and/or the like), which may be generated by the MEC device 115 serving the grid square and the user device 105 physically residing in the grid square, the machine learning model may predict peak application capacities in similar RF footprints. A beneficial side effect of predicting the peak application capacity is that the machine learning model may also predict the MEC compute requirements to serve the applications in similar RF footprints. The application capacity requirements may include data identifying capacities utilized by the applications provided by the MEC devices 115 and the MEC compute requirements may include data identifying computing resources utilized by the MEC devices 115 to provide the applications.

As further shown in FIG. 1C, and by reference number 155, the monitoring system 120 may generate labeled and normalized images of RAN coverage areas based on the application capacity requirements and MEC compute requirements. For example, the monitoring system 120 may label and normalize the application capacity requirements and the MEC compute requirements associated with images of RAN coverage areas to generate the labeled and normalized images of RAN coverage areas. In some implementations, the monitoring system 120 may label and normalize the application capacity requirements and the MEC compute requirements associated with images of RAN coverage areas based on power levels and geographic areas associated with the RAN coverage areas. For example, the monitoring system 120 may determine power levels and geographic areas corresponding to the power levels, and may represent each power level and corresponding geographic area with a visual indicator label (e.g., a color, a shading, and/or the like) that corresponds to the power level. In one example, the color green may correspond to a first power level (e.g., greater than −80 decibel-milliwatts (dBm)), the color yellow may correspond to a second power level (e.g., greater than −90 dBm and less than or equal to −80 dBm), the color orange may correspond to a third power level (e.g., greater than −100 dBm and less than or equal to −90 dBm), the color red may correspond to a fourth power level (e.g., less than −100 dBm), and/or the like. In some implementations, labeling and normalizing the application capacity requirements and the MEC compute requirements associated with images of RAN coverage areas may simplify image classification logic in the machine learning model.

Figure 1D:
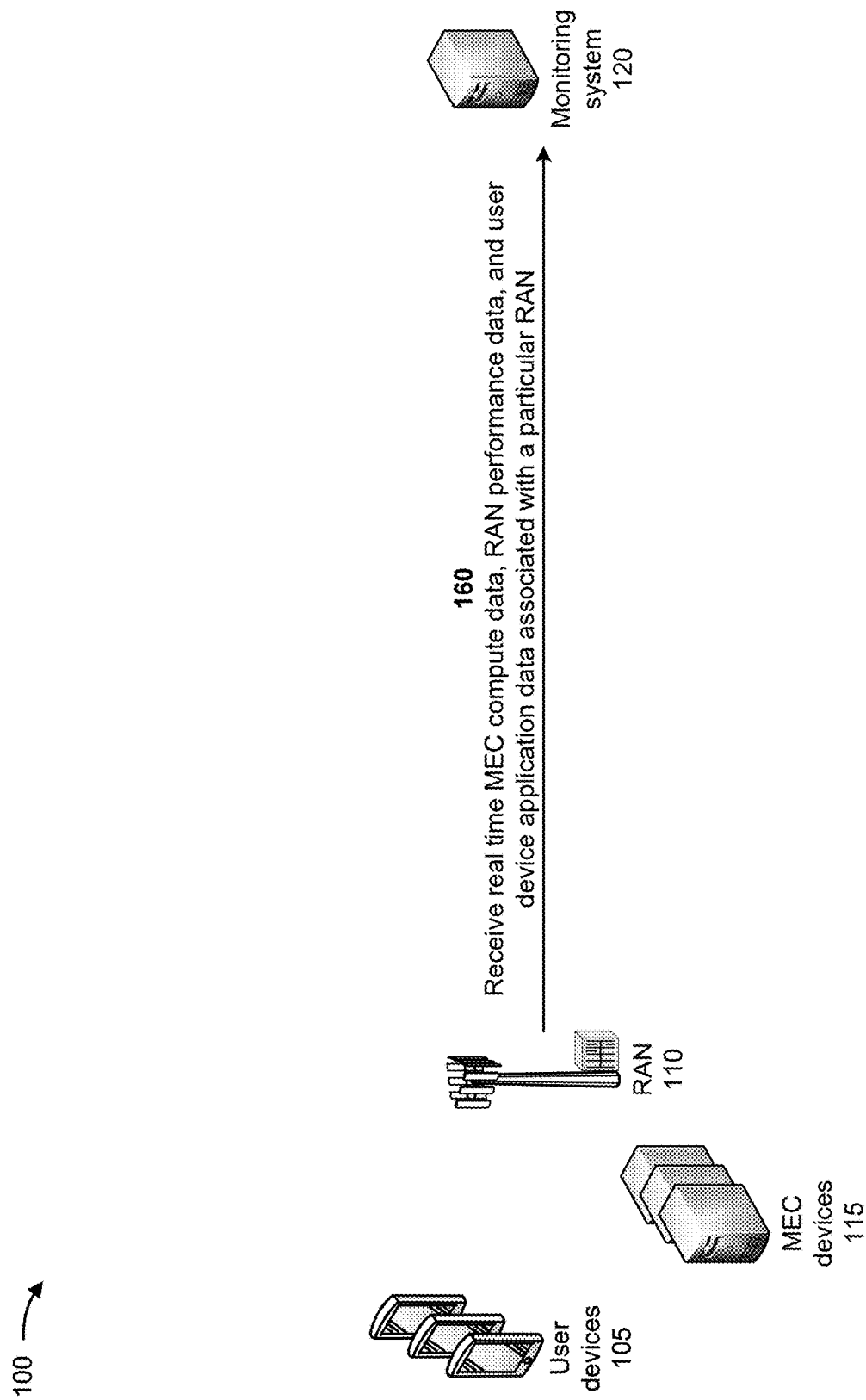

As shown in FIG. 1D, and by reference number 160, the monitoring system 120 may receive real time MEC compute data, RAN performance data, and user device application data associated with a particular RAN. For example, the MEC devices 115 may provide multiple applications to the user devices 105 associated with the particular RAN 110. While the user devices 105 are utilizing the applications, the MEC devices 115 may generate the real time MEC compute data. The MEC compute data may include data identifying computing resource utilization by the MEC devices 115 during utilization of the applications by the user devices 105. The MEC devices 115 may provide the MEC compute data to the monitoring system 120, and the monitoring system 120 may receive the MEC compute data from the MEC devices 115. The monitoring system 120 may continuously receive the MEC compute data from the MEC devices 115, may periodically receive the MEC compute data from the MEC devices 115, may receive the MEC compute data from the MEC devices 115 based on providing requests to the MEC devices 115, and/or the like.

While the user devices 105 are utilizing the applications, the particular RAN 110 may generate the real time RAN performance. The RAN performance data may include data identifying an RF footprint of the particular RAN 110 during utilization of the applications by the user devices 105, signal strength/quality bands of the RF footprint during utilization of the applications by the user devices 105, and/or the like. The particular RAN 110 may provide the RAN performance data to the monitoring system 120, and the monitoring system 120 may receive the RAN performance data from the particular RAN 110. The monitoring system 120 may continuously receive the RAN performance data from the particular RAN 110, may periodically receive the RAN performance data from the particular RAN 110, may receive the RAN performance data from the particular RAN 110 based on providing a request to the particular RAN 110, and/or the like.

While the user devices 105 are utilizing the applications, the user devices 105 may generate the real time user device application data that includes data identifying performance of the applications utilized by the user devices 105, QoS associated with the applications when utilized by the user devices 105, bandwidth utilizations by the applications, throughput associated with the applications, and/or the like. The user devices 105 may provide the user device application data to the monitoring system 120, and the monitoring system 120 may receive the user device application data from the user devices 105. The monitoring system 120 may continuously receive the user device application data from the user devices 105, may periodically receive the user device application data from the user devices 105, may receive the user device application data from the user devices 105 based on providing requests to the user devices 105, and/or the like.

Figure 1E:
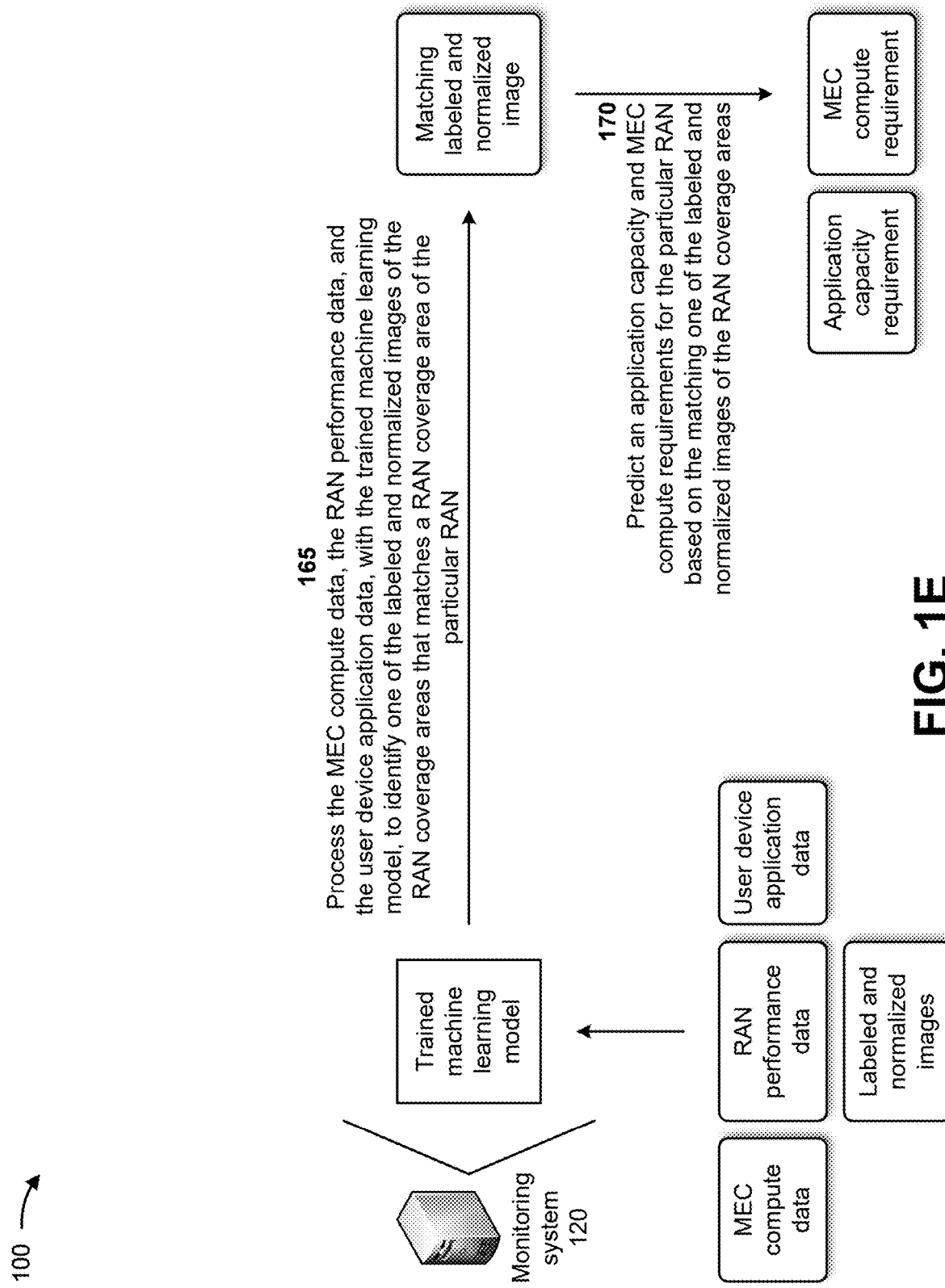

As shown in FIG. 1E, and by reference number 165, the monitoring system 120 may process the MEC compute data, the RAN performance data, and the user device application data, with the trained machine learning model, to identify one of the labeled and normalized images of the RAN coverage areas that matches a RAN coverage area of the particular RAN 110. For example, the monitoring system 120 may process the MEC compute data, the RAN performance data, and the user device application data, with the trained machine learning model, to generate a labeled and normalized image of the RAN coverage area of the particular RAN 110, in a manner described above in connection with FIGS. 1A-1C. The trained machine learning model may compare the labeled and normalized image of the RAN coverage area of the particular RAN 110 with the labeled and normalized images of the RAN coverage areas generated during training of the machine learning model. The trained machine learning model may identify one of the labeled and normalized images of the RAN coverage areas that matches (or most closely matches within a threshold percentage, such as 90%, 95%, and/or the like) the labeled and normalized image of the RAN coverage area of the particular RAN 110 based on comparing the labeled and normalized image of the RAN coverage area of the particular RAN 110 with the labeled and normalized images of the RAN coverage areas.

As further shown in FIG. 1E, and by reference number 170, the monitoring system 120 may predict an application capacity and MEC compute requirements for the particular RAN 110 based on the matching one of the labeled and normalized images of the RAN coverage areas. For example, the monitoring system 120 may identify the application capacity requirement and MEC compute requirement associated with the one of the labeled and normalized images of the RAN coverage areas, as described above in connection with FIG. 1C. Since the one of the labeled and normalized images of the RAN coverage areas matches the labeled and normalized image of the RAN coverage area of the particular RAN 110, the monitoring system 120 may predict the application capacity and MEC compute requirements for the particular RAN 110 to be equivalent to the application capacity requirement and MEC compute requirement associated with the one of the labeled and normalized images of the RAN coverage areas.

Figure 1F:
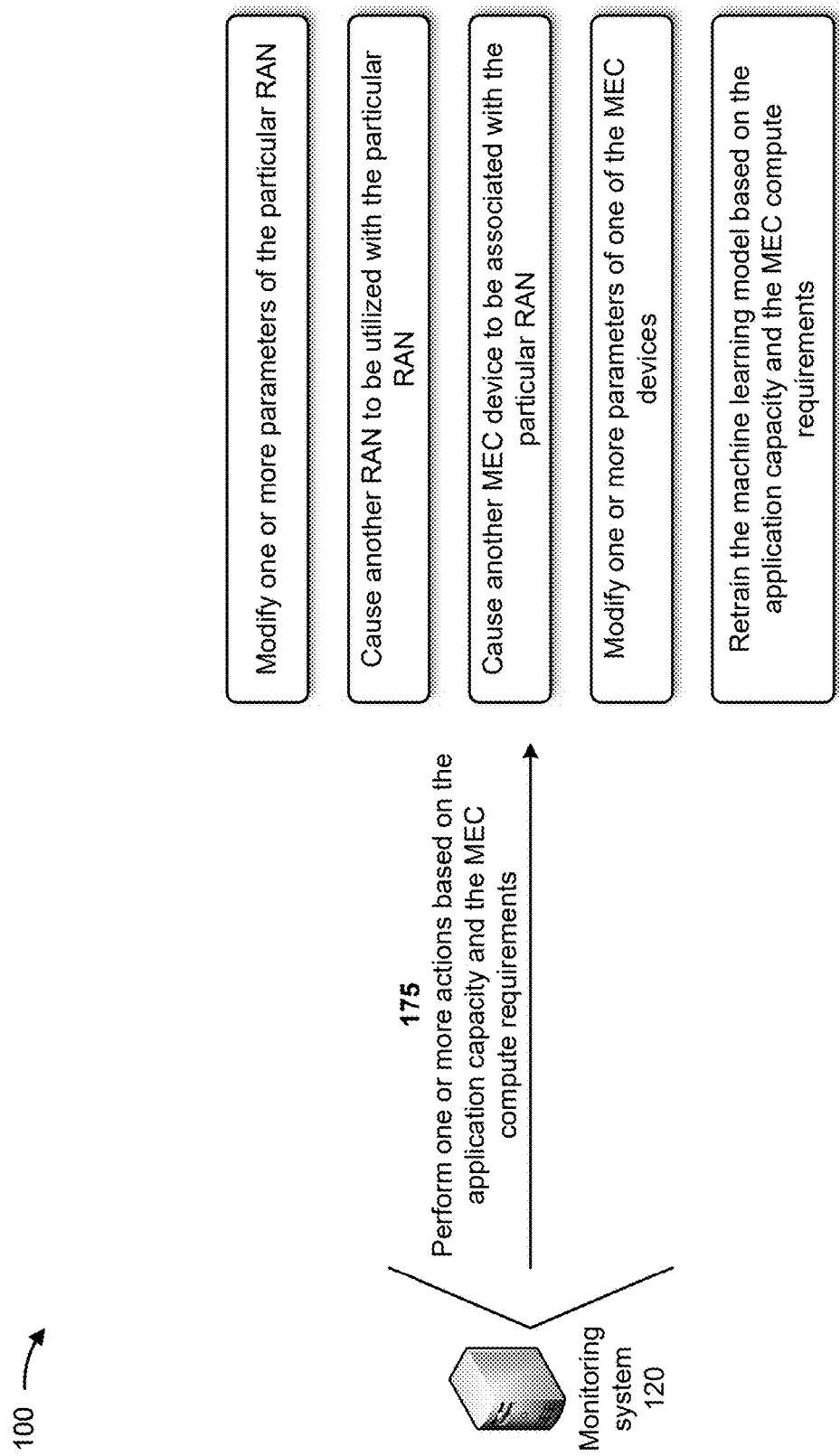

As shown in FIG. 1F, and by reference number 175, the monitoring system 120 may perform one or more actions based on the application capacity and MEC compute requirements. In some implementations, performing the one or more actions includes the monitoring system 120 modifying one or more parameters of the particular RAN 110. For example, the monitoring system 120 may determine that the particular RAN 110 needs to increase a power level based on the application capacity and MEC compute requirements. The monitoring system 120 may provide, to the particular RAN 110, instructions to modify one or more parameters that increase the power level of the particular RAN 110, and the particular RAN 110 may modify the one or more parameters. In this way, the monitoring system 120 conserves computing resources, networking resources, and/or other resources that would otherwise have been consumed by reactively monitoring capacities of applications and computing resource usage of MEC devices 115 and RANs 110.

In some implementations, performing the one or more actions includes the monitoring system 120 causing another RAN 110 to be utilized with the particular RAN 110. For example, the monitoring system 120 may determine that an additional RAN 110 needs to be utilized with the particular RAN 110 to improve performance of the applications and the MEC devices 115. The monitoring system 120 may cause the additional RAN 110 to direct RF coverage towards the particular RAN 110 so that performance of the applications, and the MEC devices 115 may be improved. In this way, the monitoring system 120 conserves computing resources, networking resources, and/or other resources that would otherwise have been consumed by rebalancing traffic at RANs 110 after observing network issues caused by application usage.

In some implementations, performing the one or more actions includes the monitoring system 120 causing another MEC device 115 to be associated with the particular RAN 110. For example, the monitoring system 120 may determine that an additional MEC device 115 needs to be utilized with the particular RAN 110 to improve performance of the applications. The monitoring system 120 may cause the additional MEC device 115 to provide the applications to the user devices 105 associated with the particular RAN 110 so that performance of the applications may be improved. In this way, the monitoring system 120 conserves computing resources, networking resources, and/or other resources that would otherwise have been consumed by causing a network disruption and lost traffic due to application usage.

In some implementations, performing the one or more actions includes the monitoring system 120 modifying one or more parameters of one of the MEC devices 115. For example, the monitoring system 120 may determine that an MEC device 115 needs to provide more of the applications associated with the particular RAN 110 to improve performance of the applications. The monitoring system 120 may cause the MEC device 115 to modify one or more parameters so that provide the MEC device 115 provides more of the applications to the user devices 105 associated with the particular RAN 110 so that performance of the applications may be improved. In this way, the monitoring system 120 conserves computing resources, networking resources, and/or other resources that would otherwise have been consumed by rebalancing traffic at RANs 110 after observing network issues caused by application usage.

In some implementations, performing the one or more actions includes the monitoring system 120 retraining the machine learning model based on the application capacity and the MEC compute requirements. For example, the monitoring system 120 may utilize the application capacity and the MEC compute requirements as additional training data for retraining the machine learning model, thereby increasing the quantity of training data available for training the machine learning model. Accordingly, the monitoring system 120 may conserve computing resources associated with identifying, obtaining, and/or generating historical data for training the machine learning model relative to other systems for identifying, obtaining, and/or generating historical data for training machine learning models.

In this way, the monitoring system 120 determines, monitors, and predicts application capacity in multiple RANs 110. For example, the monitoring system 120 may determine and monitor usage of applications provided by an MEC device 115 via a RAN 110, and may calculate capacities of the applications based on the determined usage of the applications. The monitoring system 120 may determine additional applications to provide by the MEC device 115 based on the usage of the existing applications, may increase usage of the existing applications based on the capacities of the applications, and/or the like. Increasing a quantity of additional applications provided by the MEC device 115 and a quantity of existing applications provided by the MEC device 115 may optimize the computing resources of the MEC device 115 and/or the RAN 110. Thus, the monitoring system 120 may conserve computing resources, networking resources, and/or other resources that would otherwise have been consumed by reactively monitoring capacities of applications and computing resource usage of MEC devices 115 and RANs 110, rebalancing traffic at RANs 110 after observing network issues caused by application usage, causing a network disruption and lost traffic due to application usage, attempting to recover the lost traffic caused by the network disruption, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
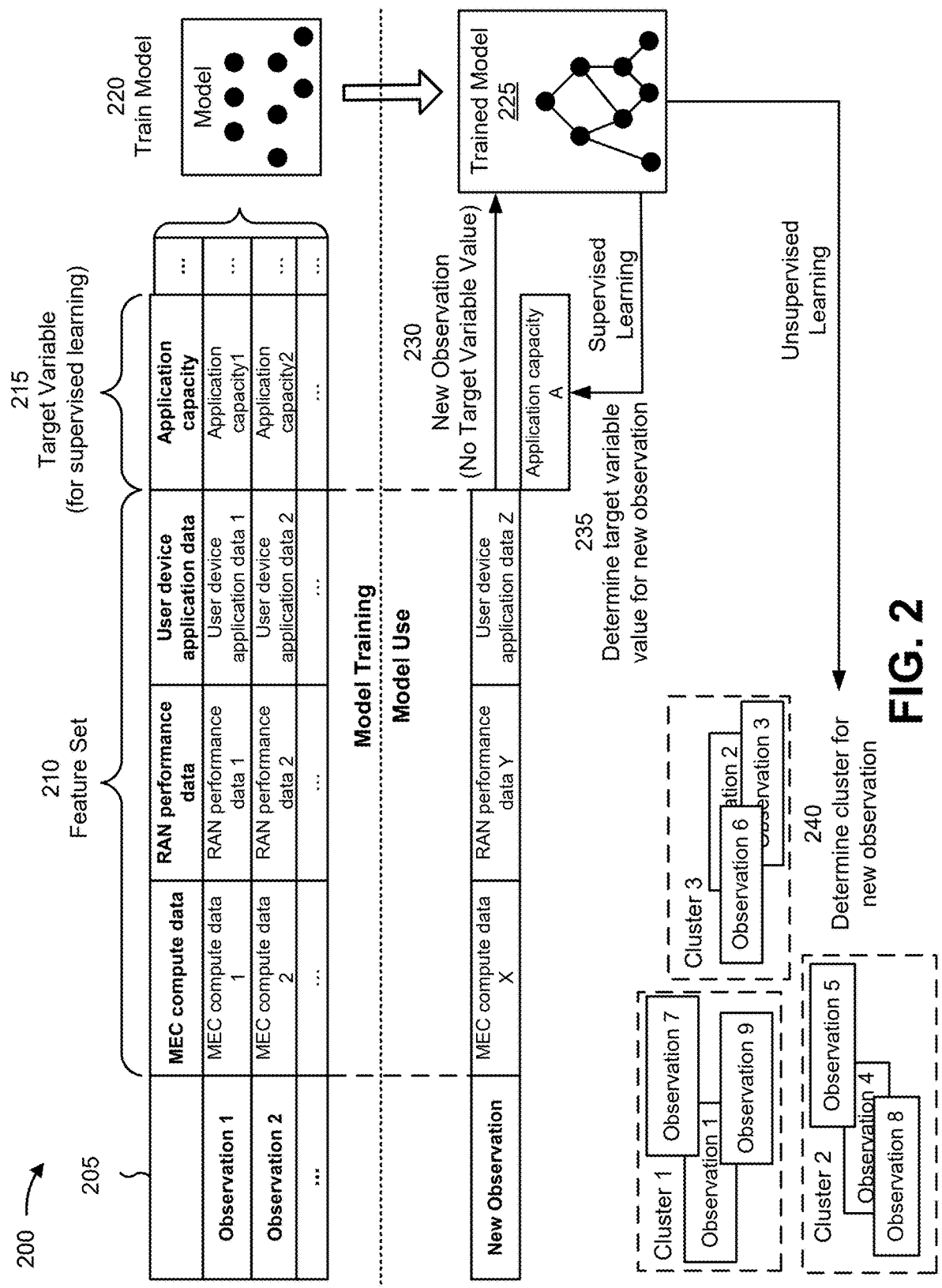
FIG. 2 is a diagram illustrating an example of training and using a machine learning model.

FIG. 2 is a diagram illustrating an example 200 of training and using a machine learning model for determining, monitoring, and predicting application capacity in multiple RANs. The machine learning model training and usage described herein may be performed using a machine learning system. The machine learning system may include or may be included in a computing device, a server, a cloud computing environment, and/or the like, such as the monitoring system 120 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the monitoring system 120, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the monitoring system 120. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of MEC compute data, a second feature of RAN performance data, a third feature of user device application data, and so on. As shown, for a first observation, the first feature may have a value of MEC compute data 1, the second feature may have a value of RAN performance data 1, the third feature may have a value of user device application data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be an application capacity and may include a value of application capacity 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of MEC compute data X, a second feature of RAN performance data Y, a third feature of user device application data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of application capacity A for the target variable of the application capacity for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an MEC compute data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an RAN performance data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine, monitor, and predict application capacity in multiple RANs. The machine learning system enables recognition and/or identification of tens, hundreds, thousands, or millions of features and/or feature values for tens, hundreds, thousands, or millions of observations, thereby increasing accuracy and consistency and reducing delay associated with determining, monitoring, and predicting application capacity in multiple RANs relative to requiring computing resources to be allocated for tens, hundreds, or thousands of operators to manually determine, monitor, and predict application capacity in multiple RANs.

As indicated above, FIG. 2 is provided as an example. Other examples may differ from what is described in connection with FIG. 2.

Figure 3:
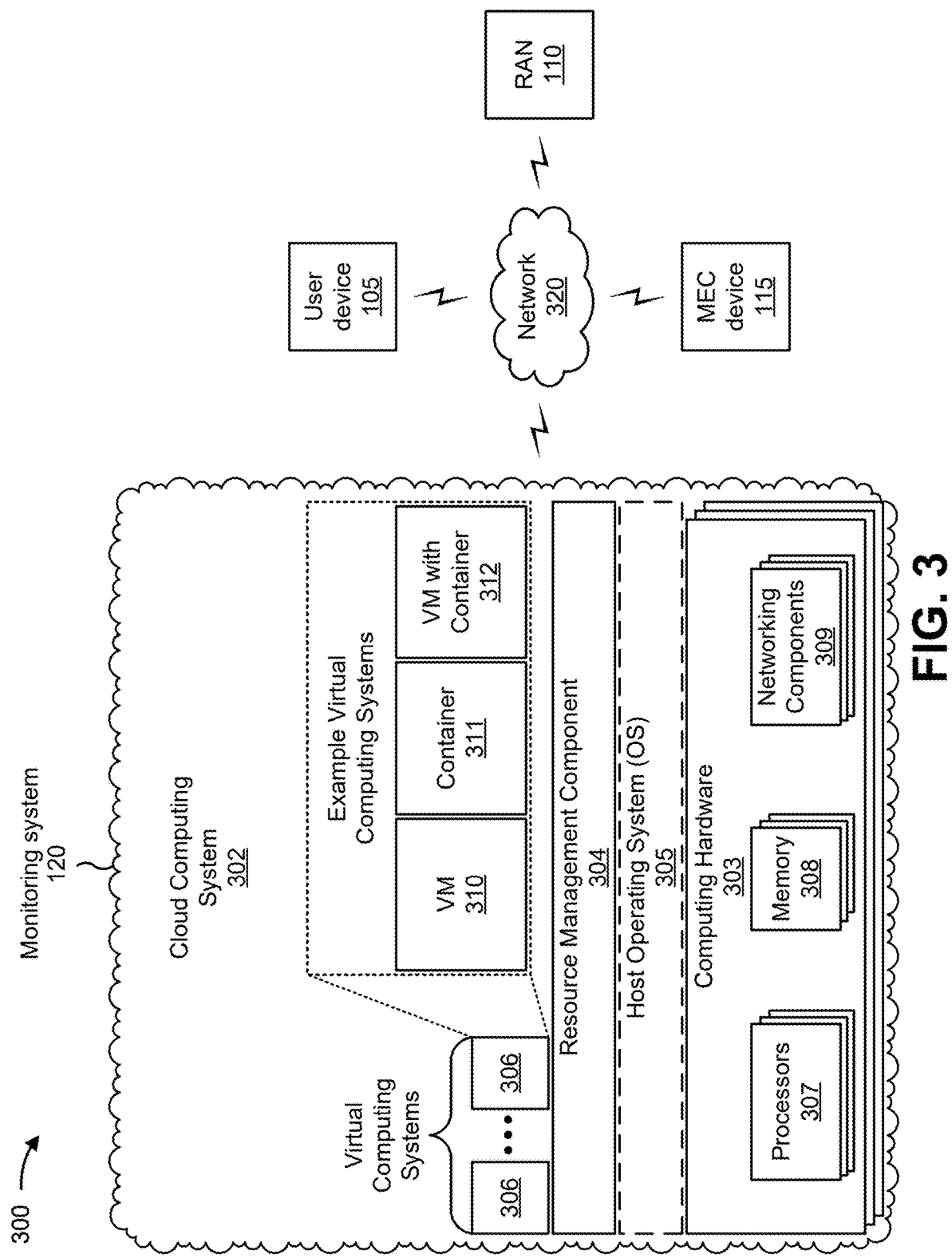
FIG. 3 is a diagram of example environments in which systems and/or methods described herein may be implemented.

FIG. 3 is a diagram of an example environment 300 in which systems and/or methods described herein may be implemented. As shown in FIG. 3, the environment 300 may include a monitoring system 301, which may include one or more elements of and/or may execute within a cloud computing system 302. The cloud computing system 302 may include one or more elements 303-313, as described in more detail below. As further shown in FIG. 3, the environment 300 may include the user device 105, the RAN 110, the MEC device 115, and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or a core network. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

The MEC device 115 may include one or more devices capable of receiving, generating, storing, processing, providing, and/or routing information, as described elsewhere herein. The MEC device 115 may include a communication device and/or a computing device. For example, the MEC device 115 may include a server, such as an application server, a client server, a web server, a database server, a host server, a proxy server, a virtual server (e.g., executing on computing hardware), or a server in a cloud computing system. In some implementations, the MEC device 115 may include computing hardware used in a cloud computing environment.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the monitoring system 301 may include one or more elements 303-313 of the cloud computing system 302, may execute within the cloud computing system 302, and/or may be hosted within the cloud computing system 302, in some implementations, the monitoring system 301 may not be cloud-based (e.g., may be implemented outside of a cloud computing system) or may be partially cloud-based. For example, the monitoring system 301 may include one or more devices that are not part of the cloud computing system 302, such as device 400 of FIG. 4, which may include a standalone server or another type of computing device. The monitoring system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
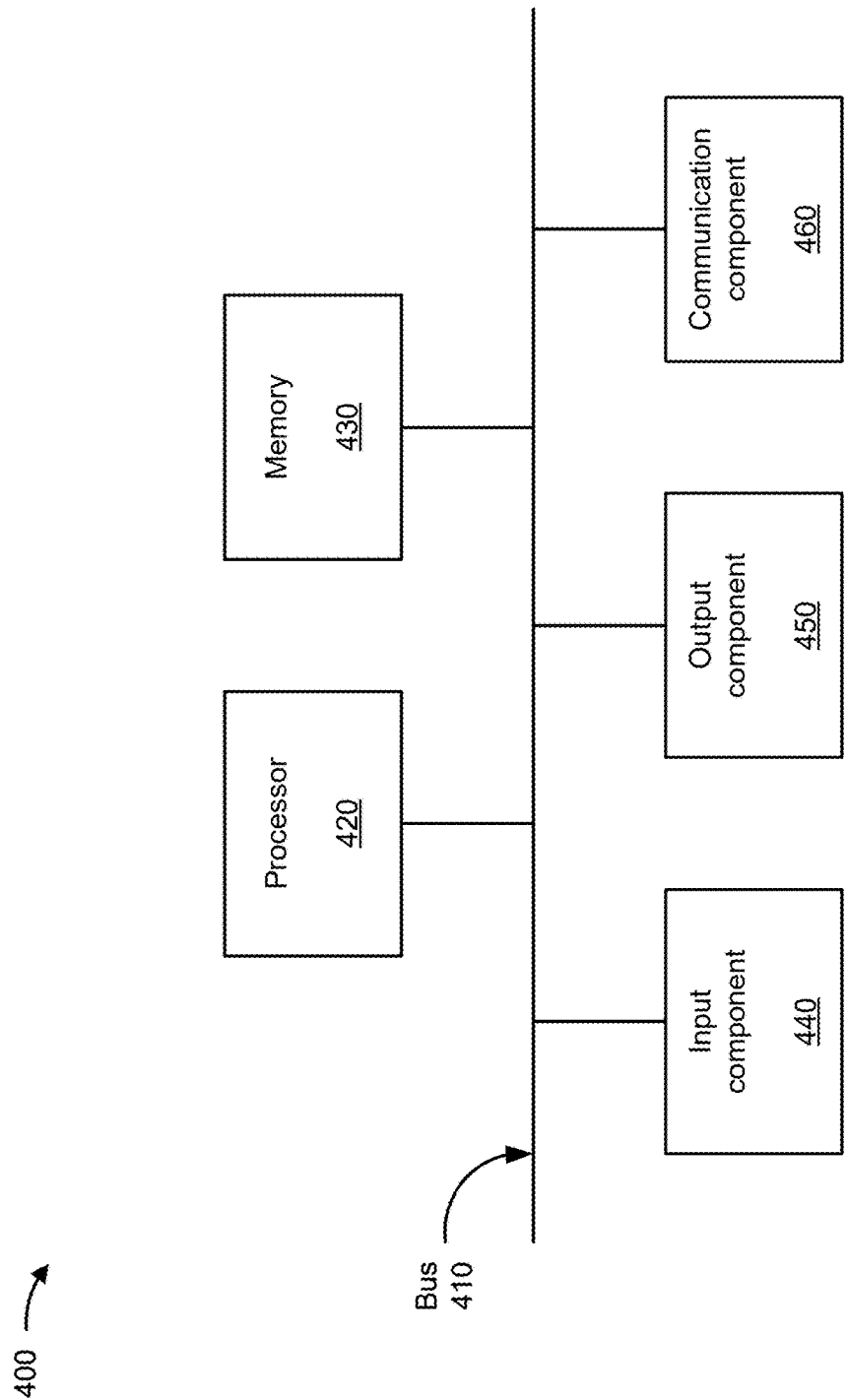
FIG. 4 is a diagram of example components of one or more devices of FIG. 3.

FIG. 4 is a diagram of example components of a device 400, which may correspond to the user device 105, the RAN 110, the MEC device 115, and/or the monitoring system 120. In some implementations, the user device 105, the RAN 110, the user device 105, the RAN 110, the MEC device 115, and/or the monitoring system 120 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
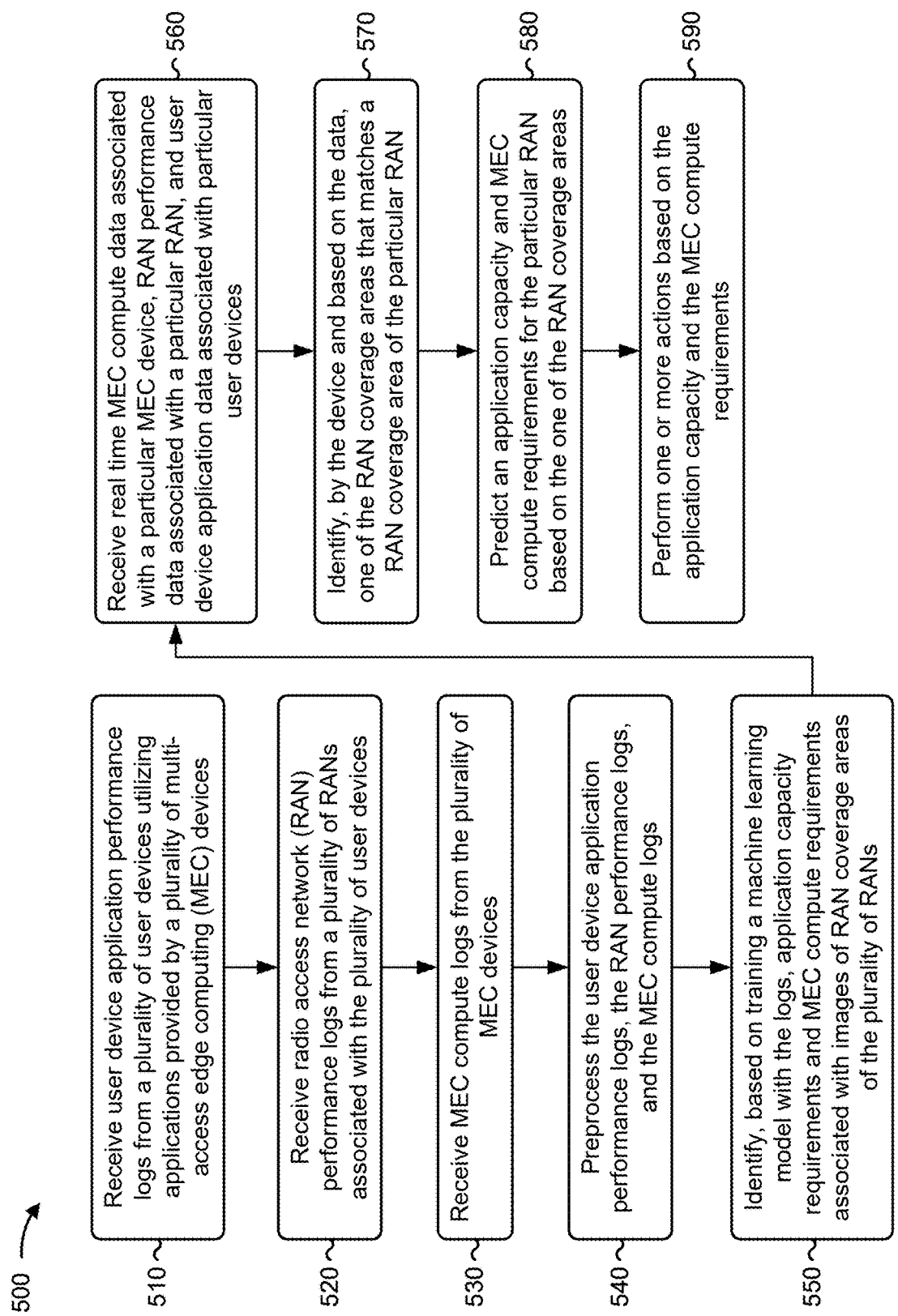
FIG. 5 is a flowchart of an example process for determining, monitoring, and predicting application capacity in multiple RANs.

FIG. 5 is a flowchart of an example process 500 for determining, monitoring, and predicting application capacity in multiple RANs. In some implementations, one or more process blocks of FIG. 5 may be performed by a device (e.g., the monitoring system 120). In some implementations, one or more process blocks of FIG. 5 may be performed by another device or a group of devices separate from or including the device, such as a user device (e.g., the user device 105) and/or an MEC device (e.g., the MEC device 115). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving user device application performance logs from a plurality of user devices utilizing applications provided by a plurality of MEC devices (block 510). For example, the device may receive user device application performance logs from a plurality of user devices utilizing applications provided by a plurality of MEC devices, as described above. In some implementations, the user device application performance logs include data identifying performance of the applications utilized by the plurality of user devices.

As further shown in FIG. 5, process 500 may include receiving RAN performance logs from a plurality of RANs associated with the plurality of user devices (block 520). For example, the device may receive RAN performance logs from a plurality of RANs associated with the plurality of user devices, as described above. In some implementations, the RAN performance logs include data identifying radio frequency footprints of the plurality of RANs and signal strength/quality bands of the radio frequency footprints.

As further shown in FIG. 5, process 500 may include receiving MEC compute logs from the plurality of MEC devices (block 530). For example, the device may receive MEC compute logs from the plurality of MEC devices, as described above. In some implementations, the MEC compute logs include data identifying computing resource utilization by the plurality of MEC devices.

As further shown in FIG. 5, process 500 may include preprocessing the user device application performance logs, the RAN performance logs, and the MEC compute logs (block 540). For example, the device may preprocess the user device application performance logs, the RAN performance logs, and the MEC compute logs, as described above. In some implementations, preprocessing the user device application performance logs, the RAN performance logs, and the MEC compute logs includes applying a grid overlay to data associated with the user device application performance logs, the RAN performance logs, and the MEC compute logs, and including additional data in each grid square associated with the grid overlay. In some implementations, the additional data includes data identifying one or more of an identifier of one of the plurality of RANs serving each grid square, a physical cell identifier associated with each grid square, a timestamp associated with one of the plurality of user devices entering into each grid square, a duration associated with one of the plurality of user devices residing in each grid square, an identifier associated with one of the plurality of user devices residing in each grid square, or an identifier of application utilized by one of the plurality of user devices residing in each grid square.

As further shown in FIG. 5, process 500 may include identifying, based on training a machine learning model with the logs, application capacity requirements and MEC compute requirements associated with images of RAN coverage areas of the plurality of RANs (block 550). For example, the device may identify, based on training a machine learning model with the user device application performance logs, the RAN performance logs, and the MEC compute logs, application capacity requirements and MEC compute requirements associated with images of RAN coverage areas of the plurality of RANs, as described above. In some implementations, the machine learning model is an image classification machine learning model. In some implementations, the images of RAN coverage areas are normalized based on power levels and geographic areas associated with the RAN coverage areas.

As further shown in FIG. 5, process 500 may include receiving real time MEC compute data associated with a particular MEC device, RAN performance data associated with a particular RAN, and user device application data associated with particular user devices (block 560). For example, the device may receive, in real time, MEC compute data associated with a particular MEC device, RAN performance data associated with a particular RAN, and user device application data associated with particular user devices, as described above.

As further shown in FIG. 5, process 500 may include identifying, based on the data, one of the RAN coverage areas that matches a RAN coverage area of the particular RAN (block 570). For example, the device may identify, based on the MEC compute data, the RAN performance data, and the user device application data, one of the RAN coverage areas that matches a RAN coverage area of the particular RAN, as described above. In some implementations, identifying the one of the RAN coverage areas that matches the RAN coverage area of the particular RAN includes processing the MEC compute data, the RAN performance data, and the user device application data, with the machine learning model, to identify the one of the RAN coverage areas that matches the RAN coverage area of the particular RAN.

As further shown in FIG. 5, process 500 may include predicting an application capacity and MEC compute requirements for the particular RAN based on the one of the RAN coverage areas (block 580). For example, the device may predict an application capacity and MEC compute requirements for the particular RAN based on the one of the RAN coverage areas, as described above. In some implementations, the application capacity requirements identify capacities utilized by the applications provided by the plurality of MEC devices and the MEC compute requirements identify computing resources utilized by the plurality of MEC devices to provide the applications.

As further shown in FIG. 5, process 500 may include performing one or more actions based on the application capacity and the MEC compute requirements (block 590). For example, the device may perform one or more actions based on the application capacity and the MEC compute requirements, as described above. In some implementations, performing the one or more actions includes modifying one or more parameters of the particular RAN and/or causing another RAN to be utilized with the particular RAN. In some implementations, performing the one or more actions includes causing another MEC device to be associated with the particular RAN and/or modifying one or more parameters of one of the plurality of MEC devices. In some implementations, performing the one or more actions includes retraining the machine learning model based on the application capacity and the MEC compute requirements.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, user device application performance logs from a plurality of user devices utilizing applications provided by a plurality of multi-access edge computing (MEC) devices;
    receiving, by the device, radio access network (RAN) performance logs from a plurality of RANs associated with the plurality of user devices;
    receiving, by the device, MEC compute logs from the plurality of MEC devices;
    preprocessing, by the device, the user device application performance logs, the RAN performance logs, and the MEC compute logs;
    identifying, by the device and based on training a machine learning model with the user device application performance logs, the RAN performance logs, and the MEC compute logs, application capacity requirements and MEC compute requirements associated with images of RAN coverage areas of the plurality of RANs;
    generating, by the device, labeled and normalized images of the RAN coverage areas based on the application capacity requirements and the MEC compute requirements;
    receiving, by the device and in real time, MEC compute data associated with a particular MEC device, RAN performance data associated with a particular RAN, and user device application data associated with particular user devices;
    identifying, by the device and based on the MEC compute data, the RAN performance data, and the user device application data, one of the RAN coverage areas that matches a RAN coverage area of the particular RAN;
    predicting, by the device, an application capacity and MEC compute requirements for the particular RAN based on the one of the RAN coverage areas; and
    performing, by the device, one or more actions based on the application capacity and the MEC compute requirements.

2. The method of claim 1, wherein identifying the one of the RAN coverage areas that matches the RAN coverage area of the particular RAN comprises:
    processing the MEC compute data, the RAN performance data, and the user device application data, with the machine learning model, to identify the one of the RAN coverage areas that matches the RAN coverage area of the particular RAN.

3. The method of claim 1, wherein the user device application performance logs include data identifying performance of the applications utilized by the plurality of user devices.

4. The method of claim 1, wherein the RAN performance logs include data identifying radio frequency footprints of the plurality of RANs and signal strength/quality bands of the radio frequency footprints.

5. The method of claim 1, wherein the MEC compute logs include data identifying computing resource utilization by the plurality of MEC devices.

6. The method of claim 1, wherein preprocessing the user device application performance logs, the RAN performance logs, and the MEC compute logs comprises:
    applying a grid overlay to data associated with the user device application performance logs, the RAN performance logs, and the MEC compute logs; and
    including additional data in each grid square associated with the grid overlay.

7. The method of claim 6, wherein the additional data includes data identifying one or more of:
    an identifier of one of the plurality of RANs serving each grid square,
    a physical cell identifier associated with each grid square,
    a timestamp associated with one of the plurality of user devices entering into each grid square,
    a duration associated with one of the plurality of user devices residing in each grid square,
    an identifier associated with one of the plurality of user devices residing in each grid square, or
    an identifier of application utilized by one of the plurality of user devices residing in each grid square.

8. A device, comprising:
    one or more processors configured to:
        train a machine learning model with user device application performance logs associated with a plurality of user devices utilizing applications provided by a plurality of multi-access edge computing (MEC) devices, radio access network (RAN) performance logs associated with a plurality of RANs, and MEC compute logs associated with the plurality of MEC devices;
        identify, based on training the machine learning model, application capacity requirements and MEC compute requirements associated with images of RAN coverage areas of the plurality of RANs;
        generate labeled and normalized images of RAN coverage areas based on the application capacity requirements and MEC compute requirements;
        receive, in real time, MEC compute data associated with a particular MEC device, RAN performance data associated with a particular RAN, and user device application data associated with particular user devices;
        process the MEC compute data, the RAN performance data, and the user device application data, with the machine learning model, to identify one of the labeled and normalized images of the RAN coverage areas that matches the RAN coverage area of the particular RAN;
        predict an application capacity and MEC compute requirements for the particular RAN based on the one of the labeled and normalized images of the RAN coverage areas; and
        perform one or more actions based on the application capacity and the MEC compute requirements.

9. The device of claim 8, wherein the application capacity requirements identify capacities utilized by the applications provided by the plurality of MEC devices and the MEC compute requirements identify computing resources utilized by the plurality of MEC devices to provide the applications.

10. The device of claim 8, wherein the machine learning model is an image classification machine learning model.

11. The device of claim 8, wherein the labeled and normalized images of RAN coverage areas are normalized based on power levels and geographic areas associated with the RAN coverage areas.

12. The device of claim 8, wherein the one or more processors, to perform the one or more actions, are configured to one or more of:
  modify one or more parameters of the particular RAN; or
  cause another RAN to be utilized with the particular RAN.

13. The device of claim 8, wherein the one or more processors, to perform the one or more actions, are configured to one or more of:
  cause another MEC device to be associated with the particular RAN; or
  modify one or more parameters of one of the plurality of MEC devices.

14. The device of claim 8, wherein the one or more processors, to perform the one or more actions, are configured to one or more of:
  retrain the machine learning model based on the application capacity and the MEC compute requirements.

15. A non-transitory computer-readable medium storing a set of instructions, the set of instructions comprising:
  one or more instructions that, when executed by one or more processors of a device, cause the device to:
    identify, based on training a machine learning model, application capacity requirements and multi-access edge computing (MEC) compute requirements associated with images of radio access network (RAN) coverage areas of a plurality of RANs,
      wherein the machine learning model is trained with user device application performance logs associated with a plurality of user devices utilizing applications provided by a plurality of MEC devices, RAN performance logs associated with the plurality of RANs, and MEC compute logs associated with the plurality of MEC devices;
    generate labeled and normalized images of RAN coverage areas based on the application capacity requirements and MEC compute requirements;
    receive, in real time, MEC compute data associated with a particular MEC device, RAN performance data associated with a particular RAN, and user device application data associated with particular user devices;
    identify, based on the MEC compute data, the RAN performance data, and the user device application data, one of the labeled and normalized images of the RAN coverage areas that matches a RAN coverage area of the particular RAN;
    predict an application capacity and MEC compute requirements for the particular RAN based on the one of the labeled and normalized images of the RAN coverage areas; and
    perform one or more actions based on the application capacity and the MEC compute requirements.

16. The non-transitory computer-readable medium of claim 15, wherein the one or more instructions further cause the device to:
  apply a grid overlay to data associated with the user device application performance logs, the RAN performance logs, and the MEC compute logs; and
  include additional data in each grid square associated with the grid overlay.

17. The non-transitory computer-readable medium of claim 16, wherein the additional data includes data identifying one or more of:
  an identifier of one of the plurality of RANs serving each grid square,
  a physical cell identifier associated with each grid square,
  a timestamp associated with one of the plurality of user devices entering into each grid square,
  a duration associated with one of the plurality of user devices residing in each grid square,
  an identifier associated with one of the plurality of user devices residing in each grid square, or
  an identifier of application utilized by one of the plurality of user devices residing in each grid square.

18. The non-transitory computer-readable medium of claim 15, wherein the application capacity requirements identify capacities utilized by the applications provided by the plurality of MEC devices and the MEC compute requirements identify computing resources utilized by the plurality of MEC devices to provide the applications.

19. The non-transitory computer-readable medium of claim 15, wherein the labeled and normalized images of RAN coverage areas are normalized based on power levels and geographic areas associated with the RAN coverage areas.

20. The non-transitory computer-readable medium of claim 15, wherein the one or more instructions, that cause the device to perform the one or more actions, cause the device to one or more of:
  modify one or more parameters of the particular RAN;
  cause another RAN to be utilized with the particular RAN;
  cause another MEC device to be associated with the particular RAN;
  modify one or more parameters of one of the plurality of MEC devices; or
  retrain the machine learning model based on the application capacity and the MEC compute requirements.

* * * * *